July 7, 1931. M. HERZBERG 1,812,953
FINISHED PATTERN AND METHOD OF MAKING SAME
Filed June 23, 1924 7 Sheets-Sheet 1

INVENTOR
Max Herzberg
BY
Warfield and Watson
ATTORNEY

July 7, 1931. M. HERZBERG 1,812,953
FINISHED PATTERN AND METHOD OF MAKING SAME
Filed June 23, 1924 7 Sheets-Sheet 2

INVENTOR
Max Herzberg
BY
Warfield and Watson
ATTORNEY

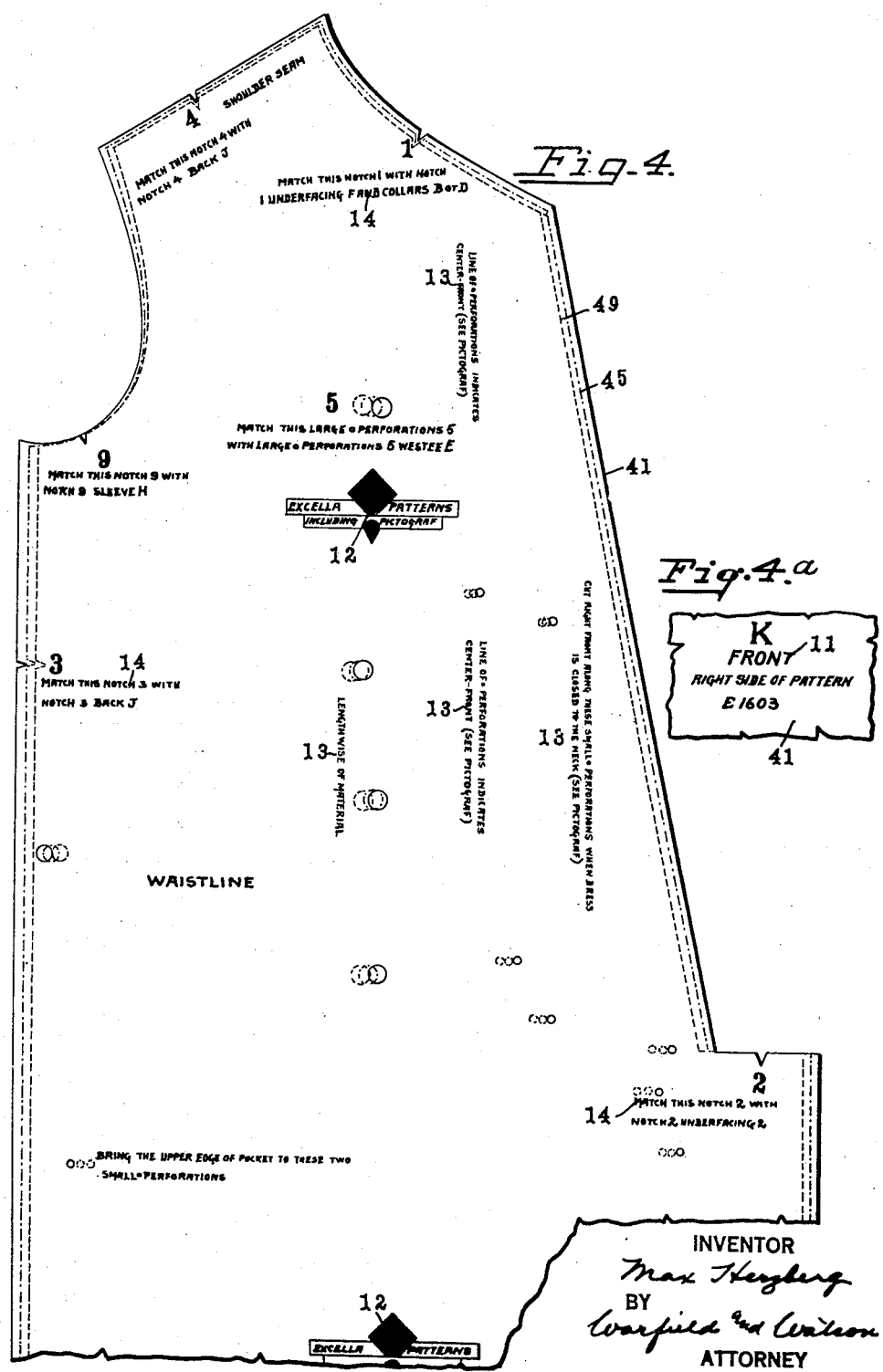

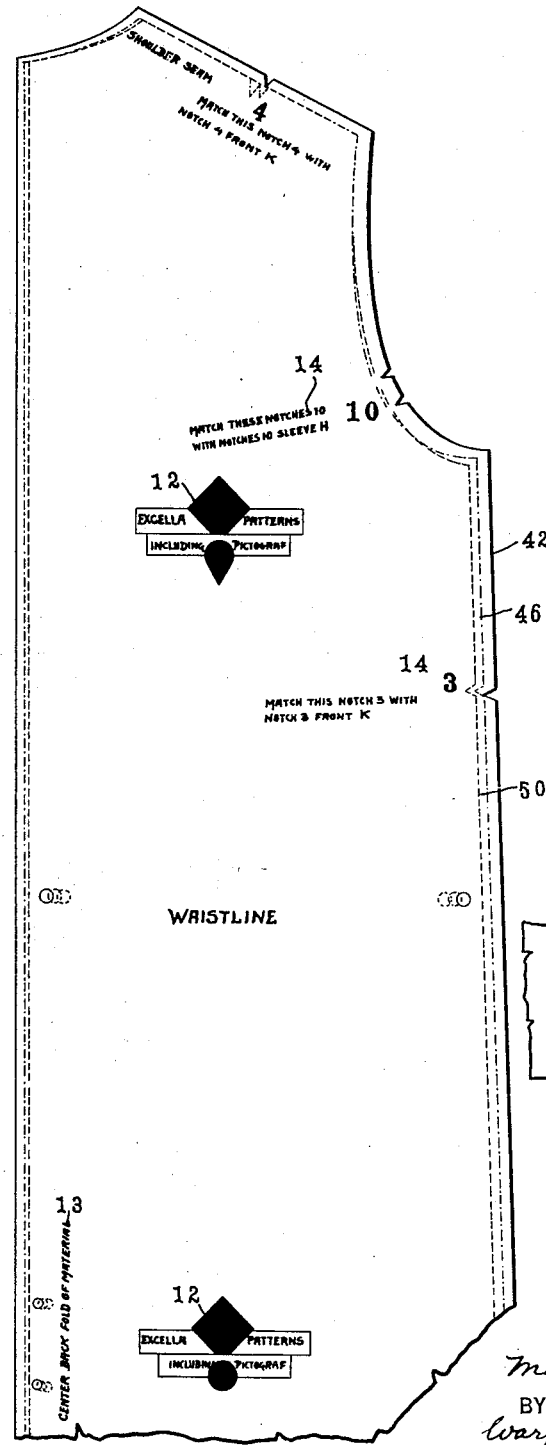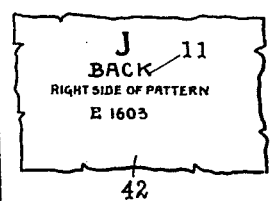

July 7, 1931.  M. HERZBERG  1,812,953

FINISHED PATTERN AND METHOD OF MAKING SAME

Filed June 23, 1924  7 Sheets-Sheet 6

INVENTOR
Max Herzberg
BY
Warfield and Watson
ATTORNEY

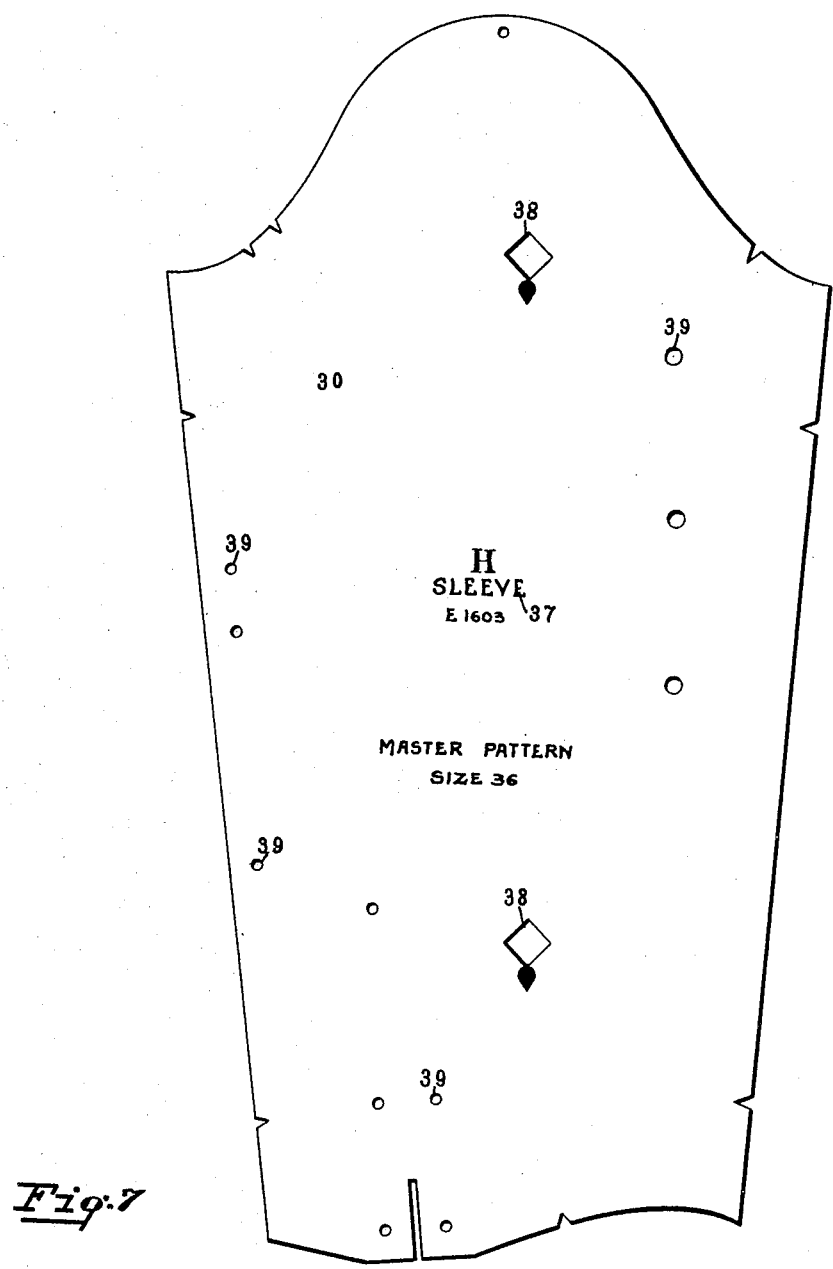

Patented July 7, 1931

1,812,953

UNITED STATES PATENT OFFICE

MAX HERZBERG, OF NEW YORK, N. Y., ASSIGNOR TO PICTORIAL REVIEW COMPANY, OF NEW YORK, N. Y., A CORPORATION OF NEW YORK

FINISHED PATTERN AND METHOD OF MAKING SAME

Application filed June 23, 1924. Serial No. 721,652.

This invention relates to an improved method of manufacturing tissue-paper patterns, as well as to the finished articles produced thereby.

It is an object of the present invention to provide an improved method of producing pattern sections, according to which the cost of manufacture of the finished pattern sets is materally reduced.

A further object is that of providing a simple and efficient method of manufacture which permits any one of a plurality of differently sized pattern sets to be constructed from common blanket sheets.

An additional object is that of furnishing a method which may readily be practiced by a relatively unskilled person, and according to which finished articles will be produced which may be more efficiently employed.

Another object is to provide improved means for use in the production of finished pattern sections.

Other objects of the invention will in part be obvious and will in part appear hereinafter.

The invention accordingly comprises the several steps and the relation and order of one or more of such steps with respect to each of the others, and the article possessing the features, properties, and the relation of elements, which are exemplified in the following detailed disclosure, and the scope of the application of which will be indicated in the claims.

For a fuller understanding of the nature and objects of the invention, reference should be had to the following detailed description taken in connection with the accompanying drawings, in which.

Figure 2:
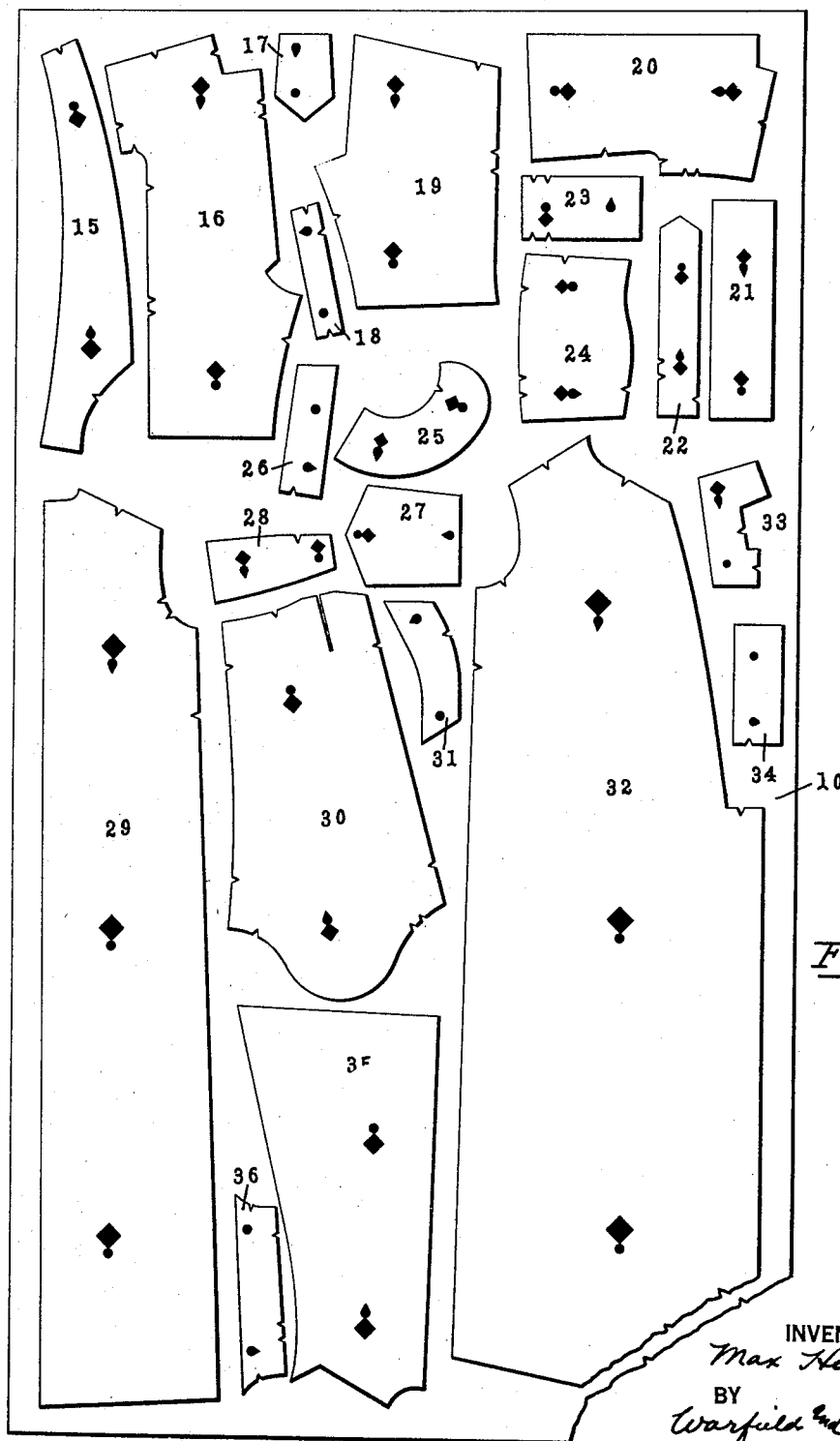
Fig. 2 shows this sheet with the master patterns applied thereto.
Figure 3:
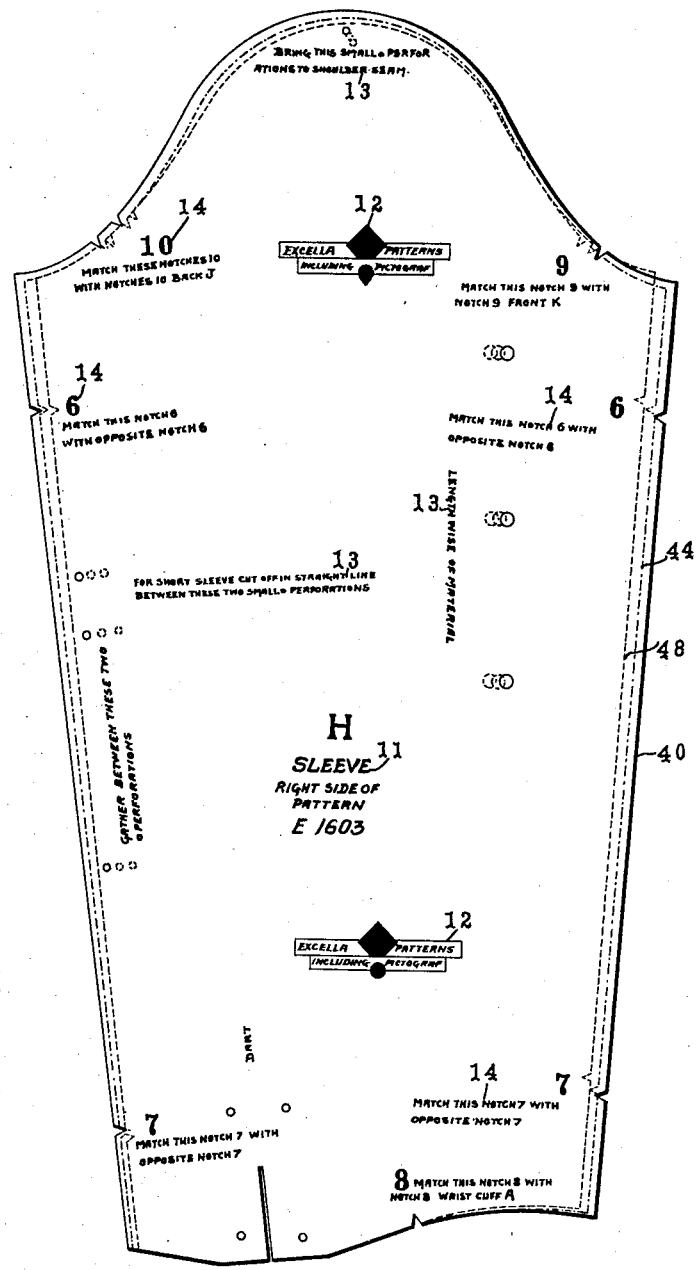
Figure 6:
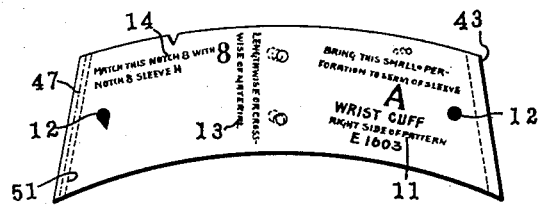
Figure 9:
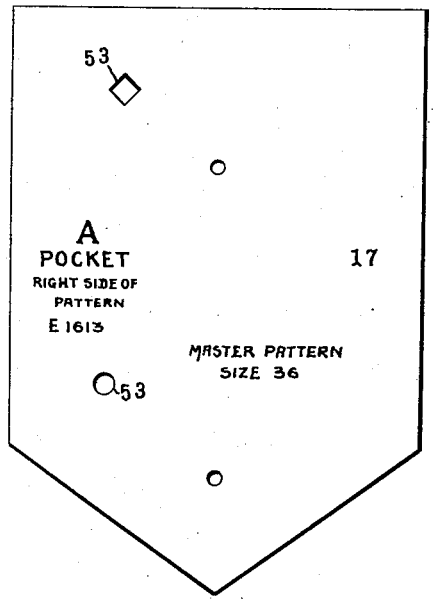
Figure 8:
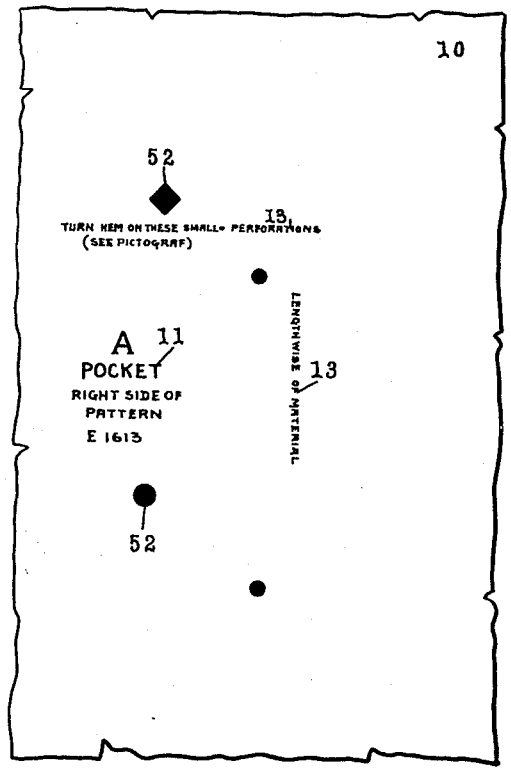

Figs. 3, 4, 4ª, 5, 5ª and 6 are detailed illustrations of various finished pattern sections;

Fig. 7 illustrates in detail one of the master patterns shown in Fig. 2;

Fig. 8 is a fragmentary view of a portion of a blanket sheet having slightly modified keymarks from those illustrated in the preceding figures; and Fig. 9 shows a master pattern such as may be used in connection with the sheet illustrated in Fig. 8.

In practicing the method to produce finished articles having the hereinafter stated characteristics, it will be understood that, given a garment of a certain design, a pattern cutter will in accordance with this invention provide a number of different sized sets of master patterns, each including a series of cooperable unit pattern sections, by means of which the desired garment may be reproduced in different sizes.

By using one of these sets of patterns a plate or series of plates is laid out, and by means of which a blanket sheet may be printed. A web of material, as, for example, tissue paper, is now run through the printing press and subdivided in order to produce a suitable number of sheets, one of which is indicated at 10 in Fig. 1.

According to the present invention the pattern designer at the time of the production of the different sets of master patterns will indicate, preferably, an outline of the various pattern sections manipulation to which the pattern sections are to be subjected. At this time, the master patterns are also provided with certain keypatterns are also provided with certain key-
marks, as well as indications, and all of this indicia is incorporated in the plate or series of plates, by means of which the blanket sheets are printed.

Figure 1:
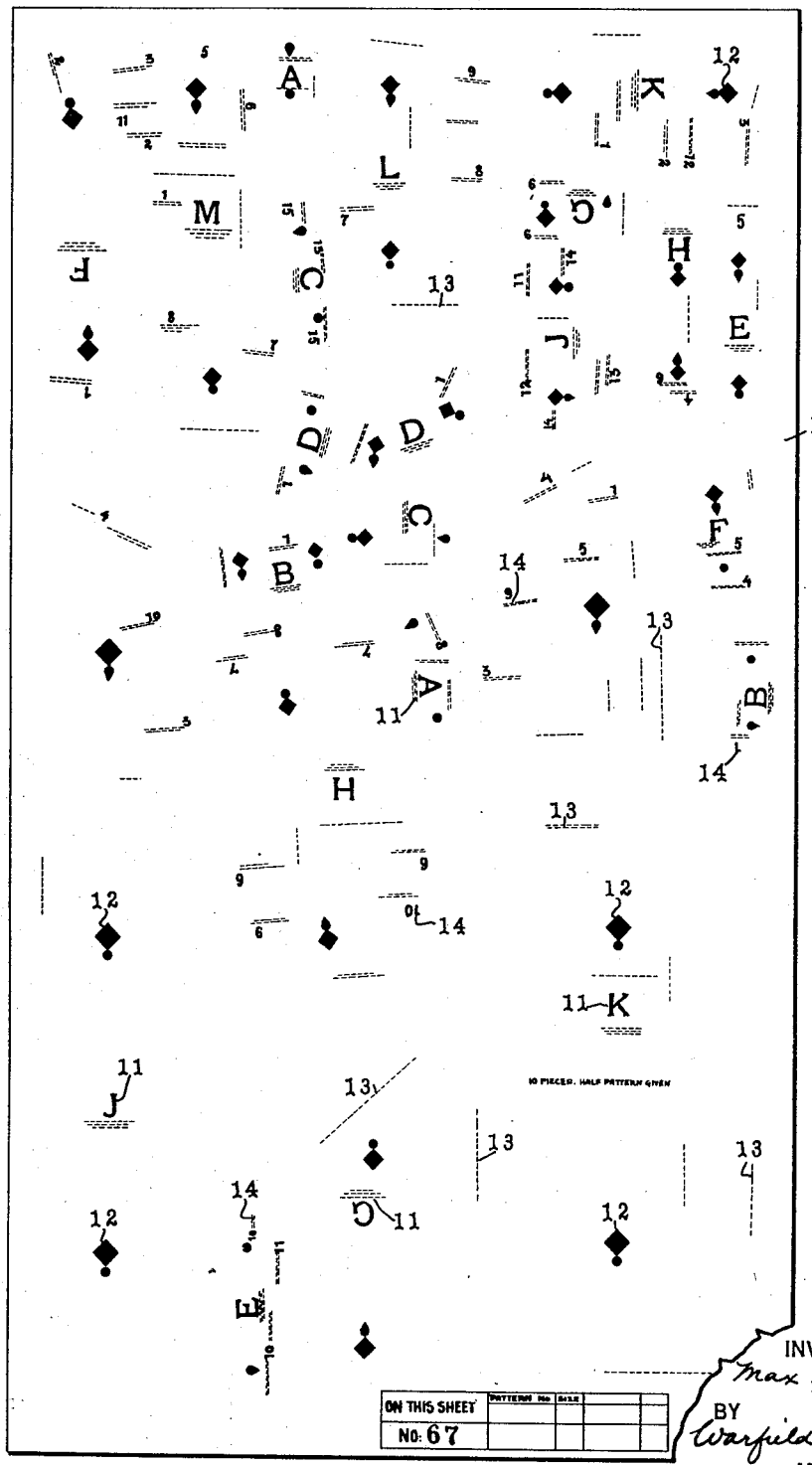
Fig. 1 is a plan view of a printed blanket sheet.

Thus, referring to Fig. 1, it will be noted that the blanket sheet has a number of different sections, as, for example, cuff A, sleeve H, front K, back J, etc. Each of these sections, in addition to having an identifying mark 11, has keymarks, which in the present instance take the form of a trade-mark insignia or distinctive symbol 12. It is furthermore preferred that each section of the blanket sheet bear certain written instructions for the user or other data indicating certain portions of its surface, as has been indicated at 13 and 14.

After a desired number of blanket sheets is produced they are arranged in the form of a stack, care being taken that the edges of the sheets are in substantial registry with each other.

The master pattern sections, as, for example, 15 to 36 inclusive, are now arranged, as in Fig. 2, upon the uppermost of the stack of blanket sheets. In this connection it should be noted, as has been indicated in Fig. 7, in which the master pattern 30 has been illustrated in detail, that the master pattern preferably has a code or other suitable indication 37, by means of which the arranging of this pattern over the corresponding section of the blanket sheet is greatly facilitated. In order to obtain exact registration between the master pattern and the underlying blanket sheet it will now be observed that the master pattern may be provided with keymarks corresponding to the keymarks 12 on the blanket sheet, it being noted in the present instance that the keymarks of the master pattern are in the form of openings 38, corresponding in outline to the keymarks 12 appearing upon the blanket sheet. As a consequence, it will be understood that an operator, by bringing the edges of the openings 38 into registry with the outline of the keymarks 12, will be readily enabled to arrange the master pattern sections to cover exactly those portions of a blanket sheet to which they correspond, and after the parts are thus arranged the master patterns may be secured to the stack of sheets in any desirable manner.

While thus held the outline of the master pattern is traced, and a band saw may be utilized to cut through the stack and thus provide a plurality of stacks of unit pattern sections. Drills may also be used to pass through the openings 39 in the master pattern to punch corresponding openings in the underlying stack of blanket sheets.

After the outlining and cutting operation has been completed, it will be found that a stack of pattern sections has been produced corresponding in number to the number of blanket sheets in the stack, and each of these sections will correspond exactly to the outline of the master pattern and will have all of the characteristics of the same, as, for example, perforations and notches. Also, in the event that all of the afore-described indicia is applied to the blanket sheet, each of the sections, as in Figs. 3, 4ª, 5ª and 6, will present code-marks 11, and instruction data or other suitable indicia 13 and 14, it being understood in connection with the latter that it is preferred that each set of patterns be accompanied by an instruction sheet indicating in detail the manner in which each pattern section is to be manipulated and the mode of association of the same with other sections, this instruction sheet referring to the indicia on the finished pattern sections.

From the foregoing it will be understood that a method is provided by means of which finished pattern sections are produced each of which will correspond in outline to the garment section which is to be cut, and which may carry full instructions and other suitable indicia serving to facilitate the use of the pattern set.

In addition to the foregoing, it will be observed that by means of the present construction it is only necessary to provide one plate or series of plates, in order to furnish sets of pattern sections of different sizes. In other words, assuming that it is desired to furnish sets of pattern sections in three different sizes, a number of blanket sheets are provided, and arranged in stacks corresponding in number to the number of different sized sets to be furnished. Thereafter, differently sized sets of master patterns are arranged in the manner afore-described over the proper sections of the different stacks of blanket sheets.

The outlining, perforating and notching operations are now resorted to, and finished pattern sections will be produced. Certain of these sections have been shown at 40, 41, 42 and 43 in Figs. 3, 4, 5 and 6, respectively. Smaller sections than those indicated at 40, 41, 42 and 43 have been shown at 44, 45, 46 and 47, and still smaller sized sections have been indicated at 48, 49, 50 and 51, it being noted that, due to the peculiarities of the keymarks of the blanket sheets and master patterns, when these parts are in registry, different sized master patterns may be employed to produce virtually any desired size of pattern section (within reasonable limits).

It will thus be understood that the stack of blanket sheets previously referred to is, in the present instance, subdivided into three individual stacks, the similar sections of which are outlined by sets of different sized master patterns in order to produce sets of finished pattern sections of different sizes, as at 40, 44 and 48, and it is to be appreciated that the indicia of the blanket sheets is so arranged that it is disposed within the area covered by the smallest of the master patterns which is to be associated therewith. Each of these individual stacks will be outlined, perforated and notched according to the characteristics of the master patterns which are employed for this purpose, and although, incident to the defects occurring in connection with printing and stacking the sheets the indicia on consecutive sheets may fall in slightly different positions, the notches, perforations, etc. used in connection with the indicia will nevertheless be substantially adjacent the same, so that no confusion may arise in the use of the pattern sections.

Referring finally to Figs. 8 and 9 it will be understood that any desirable keymarks may be employed in lieu of the keymarks shown in the preceding figures. For example, the blanket sheet may have each of its sections 13 ovided with keymarks 52 of different configurations, and each master pattern may have keymarks 53 in the nature of openings corresponding in outline to the keymarks 52 of the blanket sheet. It is obvious in this connection that similarly to the keymarks shown in Figs. 1 to 7 inclusive the keymarks of Figs. 8 and 9 act in an indicating manner, that in order to obtain proper registry between the keymarks of the master pattern and the uppermost blanket sheet it will be necessary first to apply the master pattern to the blanket sheet in such a manner that it covers that portion of the same to which it corresponds, and secondly, that it is applied to that portion in such a manner that a perfect finished pattern section will be produced.

From the foregoing it will be understood that the expense of preparing a different plate or plates for each size of pattern sections is avoided, aside from the fact that all other expenses incident to these differences in dimension are also eliminated, and that by means of the present invention it is practicable to utilize blanket sheets corresponding in size and arrangement of indicia, etc., to provide finished corresponding pattern sections of different sizes. This is accomplished without the sacrifice of the indicia, and without necessitating any other changes than are involved in substituting a master pattern of one size for that of another size.

Thus, the objects of this invention are accomplished, and since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In combination, a blanket sheet and a master pattern, a keymark upon said blanket sheet and a keymark in the form of an opening incorporated in said master pattern, said master pattern to be applied to said blanket sheet, the keymark upon the latter appearing within the keymark opening upon the former when the parts are properly correlated.

2. A method of manufacturing patterns of similar outline but different sizes, which includes preparing a plurality of blanket sheets to have indicia thereon disposed within the area of the smallest pattern to be cut therefrom, subsequently arranging said blanket sheets in different piles, placing a master pattern upon the upper sheet of each pile and covering the indicia upon said sheet in predetermined relationship thereto, the master patterns being of similar outline but each differing in size from the others and thereupon cutting the sheets of each pile along the lines indicated by the master pattern to provide a series of pattern sections.

3. A method of manufacturing a garment pattern, which comprises providing a blanket sheet of severable material having a plurality of groups of indicia thereon explanatory of the manipulations to which a corresponding garment portion is to be subjected and having a distinctive keymark disposed within the area embraced by each of said groups; applying to each of said areas a unit pattern section of a master pattern set having a keymark corresponding to the keymark of that particular group and having an area and shape such as to include within its outline said group; and thereafter cutting said blanket sheet along the outline of said unit pattern sections; said groups of indicia being so disposed on said sheet with respect to each other as to allow of master pattern sets of varying sizes to be used as aforesaid without interference of the units thereof.

4. In combination, a blanket sheet of severable material having a plurality of groups of indicia thereon explanatory of the manipulations to which a corresponding garment portion is to be subjected and having a distinctive keymark disposed within the area embraced by each of said groups, and a master pattern set comprising a plurality of unit pattern sections, each of said sections having an interiorly disposed distinctive keymark adapted to be registered with the keymark of one of said groups, and having an area and shape adapted to include within its outline said group, said groups of indicia being so disposed on said sheet with respect to each other as to allow of master pattern sets of varying sizes to be used as aforesaid without interference of the units thereof.

In testimony whereof I affix my signature.

MAX HERZBERG.